Jan. 12, 1926. 1,569,017
O. P. HOBBS
COTTON DUSTER
Original Filed Oct. 29, 1923 2 Sheets-Sheet 2
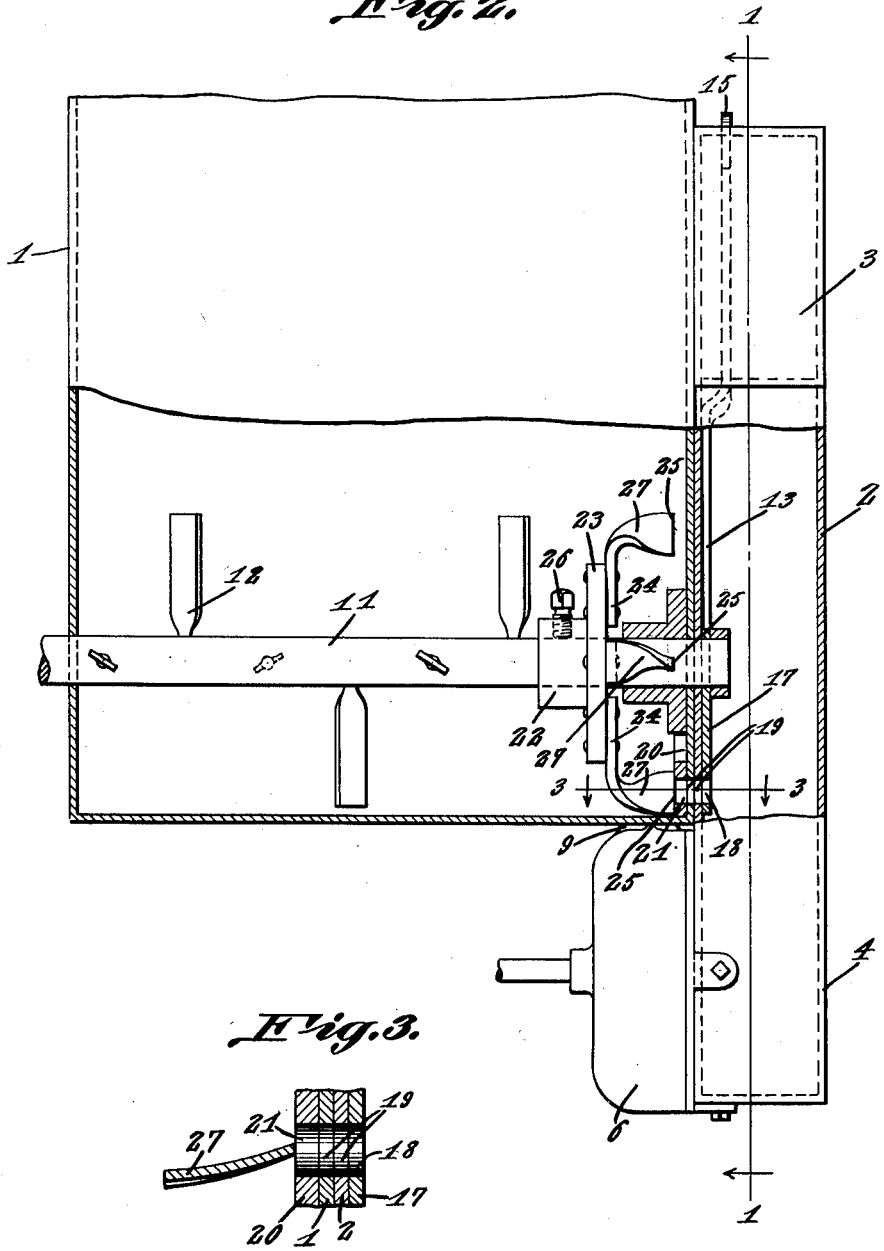

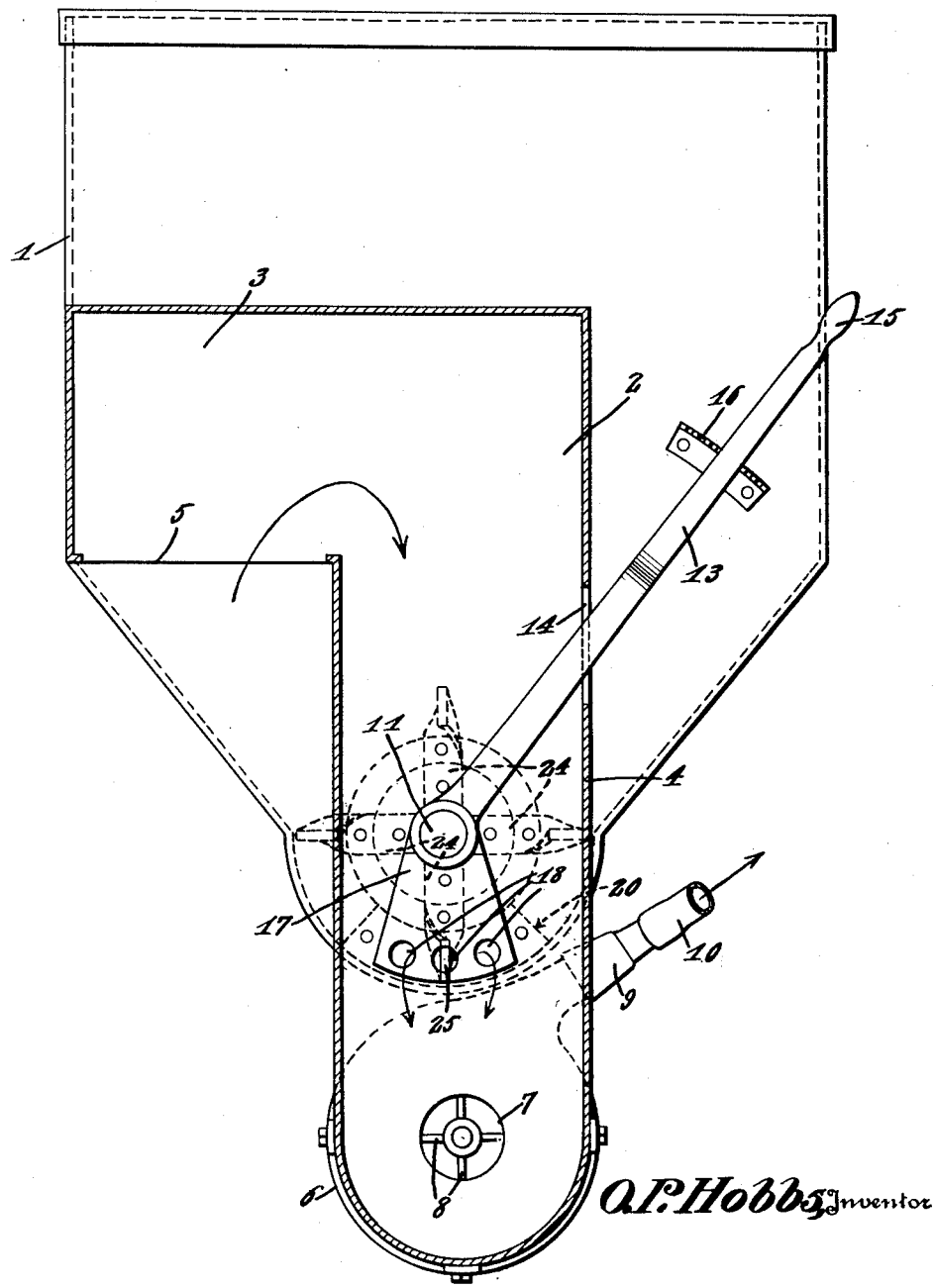

Patented Jan. 12, 1926.

1,569,017

UNITED STATES PATENT OFFICE.

ORACE P. HOBBS, OF WINDER, GEORGIA, ASSIGNOR, BY DIRECT AND MESNE ASSIGNMENTS, TO WARREN DE SOSA, OF ATLANTA, GEORGIA.

COTTON DUSTER.

Application filed October 29, 1923, Serial No. 671,604. Renewed November 21, 1925.

*To all whom it may concern:*

Be it known that I, ORACE P. HOBBS, a citizen of the United States, residing at Winder, in the county of Barrow and State of Georgia, have invented a new and useful Cotton Duster, of which the following is a specification.

This invention relates to a machine designed primarily for dusting cotton plants with a poison such as calcium arsenate for the purpose of destroying boll weevils and other objectionable insects infesting plants.

Heretofore it has not been possible to use dusting machines under all climatic conditions. Calcium arsenate has an affinity for moisture which renders it difficult to handle in an ordinary dusting machine during damp weather. This is due primarily to the fact that the particles adhere and pack when damp.

One of the objects of the present invention is to provide means whereby the powdered contents of a hopper can be forcibly expelled laterally therefrom into an air current, this current serving to convey the delivered powder to hose from which the powder can be directed onto the plants.

A further object is to provide a novel form of ejecting mechanism which insures delivery of the poison into the air flue and will operate freely into the bulk of material contained in the hopper.

A further object is to provide means whereby moisture is kept from the air flue and fan used for setting up a current, thus making it possible to use the machine in rainy weather.

Another object is to provide means whereby the delivery of powder to the air flue can be controlled easily.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings

Figure 1 is a vertical longitudinal section through the air flue of a mechanism constituting the present invention, the hopper and regulating valve being shown in elevation, said figure being a section taken on line 1—1, Fig. 2.

Fig. 2 is a view partly in front elevation and partly in section of the hopper and air flue showing the mechanism constituting the present invention.

Fig. 3 is a section on line 3—3, Fig. 2.

Referring to the figures by characters of reference 1 designates a hopper adapted to be mounted on a suitable portable frame not shown. Arranged upon one side of this hopper is a flue 2 having a forwardly extending upper portion 3 and a downwardly extending rear portion 4. An air inlet 5 is provided in the bottom of the forwardly extending portion 3 while the lower end of the downwardly extending portion 4 is attached to one side of a fan casing 6 so that air flowing downwardly from the flue will enter the central inlet orifice 7 in the side of the fan casing. The fan 8 in the casing can be driven in any suitable manner and said casing has a tangential outlet 9 to which one or more flexible hose 10 can be connected.

Journaled in the walls of the hopper is a shaft 11 carrying suitable agitating blades 12. On one end of this shaft is fulcrumed a lever 13 extending through a slot 14 in the back wall of the flue 2, there being a handle 15 at the outer end of this lever by means of which it can be manipulated readily. A toothed segment 16 is provided for engagement by the lever so that said lever can be held in any position to which it may be moved. Extending from the fulcrumed end of the lever is a segmental plate 17 provided with a series of openings 18 disposed in an arc concentric with the shaft 11. These openings are adapted to move into and out of register with corresponding openings 19 formed in the contacting walls of the hopper and flue. Thus the plate 17 acts as a cut off valve and by manipulating lever 13 the openings 19 can be partly or entirely closed.

Secured to the inner face of the side wall of hopper 1 is an arcuate wear plate 20 having openings 21 registering at all times with the openings 19. Adjustably mounted on shaft 11 is a hub 22 having an annular flange 23, there being any suitable means, such as a set screw 26, for fastening the hub in any position to which it may be moved. Secured to this flange 23 are radial strips 24 the outer ends of which are turned toward the end wall of the hopper and twisted so that the edge 25 of the free end of each strip is disposed along a line radiating from the center of the shaft 11. The twisted portion of each strip constitutes a feeding blade 27 and, as shown particularly in Fig. 3, each blade is curved backwardly from the direction in which it rotates. Consequently as each blade is brought into contact with the wear plate 20 during the rotation of shaft 11, the blade exerts a wiping action as well as a deflecting action with the result that those portions of the bulk material lying adjacent the openings 21 will be pressed outwardly through said openings and from the openings 18 and 19 into the flue 2. The weight of the contents of the hopper will be sufficient to prevent upward or lateral displacement of the bulk material away from the openings 21 during the application of lateral pressure to the material by the blades.

In operation the fan 8 is rotated at a high speed by any suitable mechanism provided for that purpose so that a suction is set up through flue 2 from the inlet 5 to the outlet 7. At the same time shaft 11 is rotated and causes the bulk material to be ejected substantially in measured quantities through the outlet openings 21, 19 and 18. As the material enters the flue 2, it will be carried downwardly by the suction of air and will susequently be ejected through the outlet 7 and hose 10 by the fan. By manipulating lever 13 the outlets can be partly or entirely cut off so as thus to regulate the amount of dust supplied to a given area of a field.

Importance is attached to the peculiar arrangement and shape of the blades 27. As a result thereof the bulk material will be ejected accurately and efficiently under all climatic conditions and there is no danger of the material packing against the wall of the hopper and distorting it, as would be the case should a feed worm or the like be used. As the blades become worn they can be adjusted bodily toward the plate 20 and if said plate becomes worn a new one can be substituted therefor.

What is claimed is:—

1. The combination with a bulk holder having a side outlet and a suction flue in communication with the outlet, of a rotatable series of spaced strips adjacent the outlet, each of said strips having a laterally extended twisted portion constitute a blade, each blade having a straight free edge radially disposed relative to its axis of rotation and having its front or advancing face curved to exert a wiping deflecting action toward the outlet of material in the path of the blades.

2. The combination with a bulk holder having a lateral outlet, an air flue communicating with the outlet and having an air inlet at one end and an air outlet at its other end, and means for setting up a suction through the flue from the air inlet to the air outlet, a series of deflecting blades rotatably mounted within the bulk holder and adjacent its outlet, each blade having a straight free edge disposed radially relative to its axis of rotation, the advancing face of each blade being curved for deflecting into the outlet material in the path of the blade.

3. The combination with a bulk holder having a lateral outlet, and a suction flue communicating with an outlet, of a shaft mounted for rotation, an annular series of blades rotatable with the shaft and mounted to successively wipe across the outlet of the bulk holder and press material into the outlet, and means for adjusting the blades along the shaft to compensate for wear, and a removable wear plate adjacent the outlet for engagement with the blades, said plate having an opening registering with the outlet.

4. The combination with a hopper having an outlet in one side thereof, of a suction flue upon one side of the hopper in communication with the outlet, said flue having a forwardly extending portion provided with a bottom air inlet and a downwardly extending portion provided with an air outlet, a fan casing in communication with the air outlet, and means rotatable within the hopper for expelling bulk material through the outlet and into the flue.

5. The combination with a hopper having an outlet in one side thereof, of a suction flue upon one side of the hopper in communication with the outlet, said flue having a forwardly extending portion provided with a bottom air inlet and a downwardly extending portion provided with an air outlet, a fan casing in communication with the air outlet, means rotatable within the hopper for expelling bulk material through the outlet and into the flue, said means including spaced radial strips having laterally extending twisted end portions forming deflecting blades, each of said blades having its free end edge radially disposed, and the advancing face of each blade being curved from the direction of travel to deflect material laterally through the outlet.

6. The combination with a hopper having an outlet in one side thereof, of a suction flue upon one side of the hopper in communication with the outlet, said flue having a forwardly extending portion provided with a bottom air inlet and a downwardly extending portion provided with an air outlet, a fan casing in communication with the air outlet, means rotatable within the hopper for expelling bulk material through the outlet and into the flue, and a regulating valve adjustably mounted within the flue for controlling the flow of material from the outlet to the hopper.

In testimony that I claim the foregoing as my own, I have hereto affixed my signature.

ORACE P. HOBBS.